US007441277B2

(12) United States Patent
Burges et al.

(10) Patent No.: US 7,441,277 B2
(45) Date of Patent: Oct. 21, 2008

(54) ELECTRONIC DEPOSIT BOX SYSTEM

(75) Inventors: Ronald Llewellyn Burges, Glasgow (GB); David Sean Groundwater, Glasgow (GB); Scott Allan Smith, Glasgow (GB)

(73) Assignee: BIP Solutions Limited, Glasgow (GB)

( * ) Notice: Subject to any disclaimer, the term of this patent is extended or adjusted under 35 U.S.C. 154(b) by 458 days.

(21) Appl. No.: 09/879,734

(22) Filed: Jun. 12, 2001

(65) Prior Publication Data

US 2002/0046188 A1 Apr. 18, 2002

(30) Foreign Application Priority Data

Jun. 12, 2000 (GB) ................................. 0014414.7

(51) Int. Cl.
*H04L 29/00* (2006.01)
(52) U.S. Cl. ........................................ 726/29; 713/182
(58) Field of Classification Search ................ 713/156, 713/201; 705/26; 726/26–30
See application file for complete search history.

(56) References Cited

U.S. PATENT DOCUMENTS

| 5,617,570 | A  | * | 4/1997 | Russell et al. ............... 719/312 |
| 6,105,131 | A  |   | 8/2000 | Carroll |
| 6,192,398 | B1 | * | 2/2001 | Hunt .......................... 709/213 |
| 6,202,159 | B1 |   | 3/2001 | Ghafir et al. |
| 6,397,387 | B1 | * | 5/2002 | Rosin et al. .................... 725/44 |
| 6,430,577 | B1 | * | 8/2002 | Hart ........................... 707/201 |
| 6,453,301 | B1 | * | 9/2002 | Niwa ............................ 705/26 |
| 6,715,073 | B1 | * | 3/2004 | An et al. ...................... 713/156 |
| 6,735,623 | B1 | * | 5/2004 | Prust ........................... 709/219 |
| 6,839,750 | B1 | * | 1/2005 | Bauer et al. .................. 709/223 |
| 6,868,439 | B2 | * | 3/2005 | Basu et al. ................... 709/213 |
| 6,892,300 | B2 | * | 5/2005 | Carroll et al. ............... 713/156 |
| 2002/0029339 | A1 | * | 3/2002 | Rowe ......................... 713/182 |
| 2004/0024714 | A1 | * | 2/2004 | Wells et al. .................... 705/78 |
| 2004/0034769 | A1 | * | 2/2004 | Bacha et al. ................ 713/153 |
| 2004/0093493 | A1 | * | 5/2004 | Bisbee et al. ............... 713/156 |

FOREIGN PATENT DOCUMENTS

WO     WO 99/37054 A1     7/1999

OTHER PUBLICATIONS

Curtis et al., "Securing the Global, Remote, Mobile User", 1999, International Journal of Network Management, pp. 9-21.*
Denning, "Secure Personal Computing in an Insecure Network", Aug. 1979, Communications of the ACm, vol. 22, No. 8, pp. 476-482.*
Search Report by The British Patent Office.

* cited by examiner

*Primary Examiner*—Matthew B Smithers
(74) *Attorney, Agent, or Firm*—The H.T. Than Law Group

(57) ABSTRACT

There is disclosed a secure electronic deposit box system 25 and a related method of controlling access to electronic information, particularly suitable for use in electronic tendering or the like. The method comprises the steps of providing:
  at least one user apparatus 5;
  a remote server 10;
  a communications link 15 between the at least one user apparatus 5 and the remote server 10;
  allocating disk storage space 20 on the remote server 10 unique to the at least one user apparatus 5;
  allowing the at least one user access to the storage space 20 via secure encryption of data sent to/from the user apparatus 5 and the server 10 and username/password login to the server. By this arrangement, the at least one user apparatus 15 can send data in the form of documentation to the disk storage space 20, and can also access the documentation on the disk storage space 20.

17 Claims, 15 Drawing Sheets

Create a New Tenderbox

Before entering the details of your new tenderbox, please enter your Contact Telephone Number and your Contact Email to enable the Vault to create a new tenderbox for you.

Security Validation

Telephone:

Email:

Enter your Tenderbox Information

Title of Tender Notice:

Tender reference:

ITT (Invitation To Tender) Date (DD/MM/YYYY):

ITT (Invitation To Tender) Time (HH:MM:SS):

Tender Opening Date (DD/MM/YYYY):

Tender Opening Time (HH:MM:SS):

[Submit] [Reset]

Fig.8

Complete Enrolment Form

Online help | Help with this page

Test page 001-2001-03-09

Information for the Digital Certificate
Fill in all fields. Use only the English alphabet with no accented characters. The information marked with a " * " is included in your Digital Certificate and is available to the public.

First Name: *  (required)
Nickname or middle initial allowed
(example: John B.)

Last Name: *  (required)
(example: Smith)

E-mail Address: *  (required)
(example: jsmith@trustwise.com)

Vault PIN Number: *
(example: 12345)

Tender Reference: *

Challenge Phrase
This unique phrase protects you against unauthorised action on your Digital Certificate and should not be shared with anyone. Do not lose it! It is required to revoke and renew your Digital Certificate.

Enter Challenge Phrase:  (required)
Do not use any punctuation.

Optional: Choose Your Encryption Strength
The encryption strength indicated below is the maximum allowed by your browser software. We recommend that you leave this as it is.

Optional: Enter Comments
In some cases, your Administrator will instruct you to enter *Shared Secret* (information known only to you and the Administrator) information in this field. The Administrator uses this shared secret to verify that it really is *you* submitting the application. This comment will not be included in your Digital Certificate.

Digital Certificate Customer Contract
By applying for, submitting, or using a Digital Certificate you are agreeing to the terms of the BT TrustWise Customer Contract below:

http://vault.bipcontracts.com/client/userEnrollNS.htm

Tenderbox Title: Network Consultancy Services

Activity Log

Buyer:  Supplier:  Vault:
Event  Time - date
Supplier details edited for SeanCo
Email report sent to Buyer ten days before deadline
SeanCo emailed buyer: Subject Message from SeanCo
SeanCo uploaded file Response_02.rtf
SeanCo uploaded file Response.txt
SeanCo downloaded ITT doc invitation_doc.rtf
SeanCo downloaded ITT doc Invitation1.txt
Supplier SeanCo successfully enrolled
ITT notification emailed to 1 suppliers : SeanCo,
Buyer uploaded file invitation_doc.rtf
Buyer uploaded file Invitation1.txt
Supplier ScottCo created
Supplier SeanCo created
Buyer created tenderbox

Fig.13

ELECTRONIC DEPOSIT BOX SYSTEM

FIELD OF INVENTION

This invention relates to a secure electronic deposit box system and to a related method, particularly, though not exclusively, of or for use in electronic tendering and also bidding and auctioning.

BACKGROUND TO INVENTION

Although technologies for securely encrypting data, which is sent over TCP/IP (Transmission Control Protocol/Internet Protocol) based computer networks such as the Internet or Intranet are well established, the current state of the art only allows secure transmission of data on a peer-to-peer basis.

There is currently no system which allows users or Account Holders to securely and easily store data on their own account on a centralised server over the Internet or over an Intranet and/or share that data with Invited Participants (users who are not Account Holders but who are allowed certain access privileges to the data at certain times), or set predetermined dates and times when those Invited Participants can gain access (whether read-only, write-only or read/write) to said data.

A number of problems exist in the prior art, for example:

authentication of participants cannot be carried out over the Internet with confidence;

data cannot be stored and shared over the Internet with confidence;

data integrity cannot be guaranteed.

It is an object of at least one embodiment of at least one aspect of the present invention to provide a system that substantially mirrors electronically a conventional paper based tendering system such as a public sector tendering system covered in the UK by a relevant EU tendering Regulation.

It is a further object of at least one embodiment of at least one aspect of the present invention to provide a system that uses "digital certificates" as a validation of users to an electronic safety deposit box.

It is also an object of at least one embodiment of at least one aspect of the present invention to provide a system which provides necessary or adequate levels of security for storage of important electronic data at a relatively low cost and without any need for client-side proprietary or bespoke software or hardware, the system requiring a personal computer, on Internet connection and a standard web browser.

It is yet also an object of at least one embodiment of at least one aspect of the present invention to seek to mirror a prior art paper based procurement process and allows buyers and suppliers to action business with full confidence in the security of data that is shared, transmitted or deposited.

SUMMARY OF INVENTION

According to a first aspect of the present invention there is provided a method of controlling access to electronic information comprising the steps of providing:

at least one user (e.g., buyer or "Account Holder") apparatus;

a remote server;

a communications link between the at least one user apparatus and the remote server;

allocating disk storage space on the remote server unique to the at least one user apparatus;

allowing the at least one user access to the storage space via secure encryption of data sent to or from the user apparatus and from or to the remote server the username/password login to the server.

By this arrangement the at least one user apparatus may send data in the form of documentation to the disk storage space and may also access the documentation on the disk storage space.

Preferably the secure encryption comprises:

transactions between user and server being encrypted using SSL (Secure Socket Layer); and transactions involving access to the storage space being further protected by a requirement for the user to present a digital certificate.

Preferably the digital certificate is required whenever the user attempts to read or write from or to the storage space.

Preferably the data sent by the user apparatus is encrypted by public key in the case of SSL transactions and additionally by private key (via presentation of a digital certificate) in the case of accessing the data storage space.

Preferably the data received by the server is decrypted via private key in the case of SSL transactions and by public key in the case of digital certificate verification accessing the data storage space.

Preferably the method further comprises the additional step of optionally or selectively allowing at least one further user, (e.g., supplier), access to the data storage space.

Preferably the further users access to the data storage space can be managed by the at least one further user with regards to times and dates when the at least one further user can write to and or read from at least part of the data storage space.

Preferably a digital certificate is required by an at least one further user whenever the said at least one further user attempts to read or write from or to the storage space.

The method may in a preferred embodiment use digital certificate technology such as provided by BT Trustwise in association with VeriSign to ensure data confidentiality, data integrity, data authentication, non repudiation and proof of origin and receipt.

BT WebWorld offers a "Digital Certificate" supplied by BT Trustwise. In the context of this invention, digital certificates assure a server that a user or further user is authentic, and legitimate. A "Digital Certificate", also known as Secure Server Ivs, bind an identity to a pair of electronic keys which can be used to encrypt and sign digital information. A digital certificate makes it possible to verify a party's claim that they have the right to use a given key, helping to prevent parties using fake keys to impersonate other users. Used in conjunction with encryption, digital certificates provide a suitable security solution assuring the identity of one or all parties involved in a transaction.

A digital certificate is issued by a trusted third party, referred to as the Certification Authority (CA), such as BT Trustwise. The CA is a trusted third similar to a Passport Office. CAs are responsible for issuing, revoking, renewing and providing directories of digital certificates. CAs must follow rigorous procedures for authenticating the individuals and organizations to whom certificates are issued. All digital certificates are "signed," with the CAs private key to ensure authenticity. The CAs Public Key is widely distributed.

According to a second aspect of the present invention there is provided an electronic safety deposit box system comprising:

at least one user apparatus;

a remote server;

a communications link between the at least one user apparatus and the remote server;

disk storage space allocated on the remote server unique to the at least one user apparatus; and means for allowing the at least one user access to the storage space via secure encryption of data sent to or from the user apparatus and the server and username and password login to the server.

The applicants have named the inventive system as the 'VAULT' (Trademark). VAULT is an Online Internet/Intranet zone containing Electronic Safety Deposit Boxes analogous to a conventional bank. Users data is protected by user name password and digital certificate. Any electronic data can be stored in a safe environment. The VAULT's Safety Deposit Boxes can be used for secure electronic transactions of data between identified and Invited Participants or as storage points for data. The 'VAULT' can therefore be used in one embodiment as a secure working environment, for example, for electronic tendering such as public sector electronic tending, or as a simple secure electronic deposit box for personal or commercial use.

According to a third aspect of the present invention there is provided a method of providing an account-based Internet/Intranet service which allows account holders to create at least one secure electronic deposit box on a centralised server in which a box or boxes can be stored documentation (electronic file(s)) in a secure environment, and to manage timeframes for other Invited Participants to access said documentation and or upload further documentation of their own, and optionally allows the account holder to track all activity which takes place relating to said box or boxes.

According to a fourth aspect of the present invention there is provided a secure electronic deposit box system which is an account-based Internet/Intranet server system with a Web (HTTP) interface for uploading and downloading documentation onto a centralised server in a secure environment.

A basic 'unit' of storage in the secure electronic deposit box system may be a combination of disk storage space and dynamically updated information stored on a database. For the sake of convenience, hereinafter the applicants refer to this combination as a Secure Electronic Deposit Box (SEDB).

Users who create SEDBs must first create an account on the system. These types of users are hereafter referred to as Account Holders. Account Holders are able to create a table of other users (hereinafter referred to as Invited Participants) associated with a specific SEDB by completing and submitting Web-based forms. The Account Holders can control when the Invited Participants can be given read, write and or read/write access to the SEDB. Invited Participants must apply for and install, a digital certificate on their Web browser before being allowed access to the SEDB.

Users access the SEDB system via a Web browser and email client, and require no specialised hardware or software. Once an Account Holder has created an account on the SEDB, as many SEDBs as desired by the Account Holder may be created.

The 'documentation' referred to above can be almost any kind of computer data file, including plain text, word processing, spreadsheet, presentation, image, movie or sound files.

The SEDB features a unique 'event tracking' system, allowing certain user-defined events which can be carried out automatically at a predetermined date and time. These 'events' are typically the granting or withdrawal of access privileges to an Invited Participant. The event-tracking system is also used to alert users such as Invited Participants via email notification of certain events that are about to occur (for instance the closing date and time of a bid for which documentation is required to be uploaded onto the SEDB system).

The SEDB system features an 'activity log' allowing owners of an SEDB account, ie Account Holders, to easily determine what activity has taken place pertaining to the SEDBs created by that Account Holder.

The SEDB system features an email messaging system, allowing the SEDB system Account Holders to send messages via a Web interface to multiple users, ie Invited Participants, who entered onto the Account Holder's system.

Although the Secure Electronic Deposit Box requires no special software or hardware to be installed on any of the computers of the users, the system can be modified to work with smart card readers and other specialised hardware to provide extra layers of security.

According to a fifth aspect of the present invention there is provided a computer program product for use in any of the aforementioned aspects of the present invention.

According to a sixth aspect of the present invention there is provided a computer program for use or when used in any of the aforementioned aspects of the present invention.

According to a seventh aspect of the present invention there is provided a computer or computer network when loaded with a computer programme according to the sixth aspect of the present invention.

BRIEF DESCRIPTION OF DRAWINGS

An embodiment of the present invention will now be described by way of example only with reference to the accompanying drawings, which are:

FIG. 8 an Account Holder Tender Box Creation Web Form for use in the methods of FIGS. 6(a) and (b);

FIG. 9 an Account Holder Digital Certificate Issuance Web Form;

FIG. 10 an Account Holder Ddd Invited Participants Web Form;

FIG. 11 an SEDB Account Holder side menu subsequent to depositing of documents by Invited Participants;

FIG. 13 an SEDB Account Holder side menu detailing an Activity log for said SEDB.

DETAILED DESCRIPTION OF DRAWINGS

Figure 1:
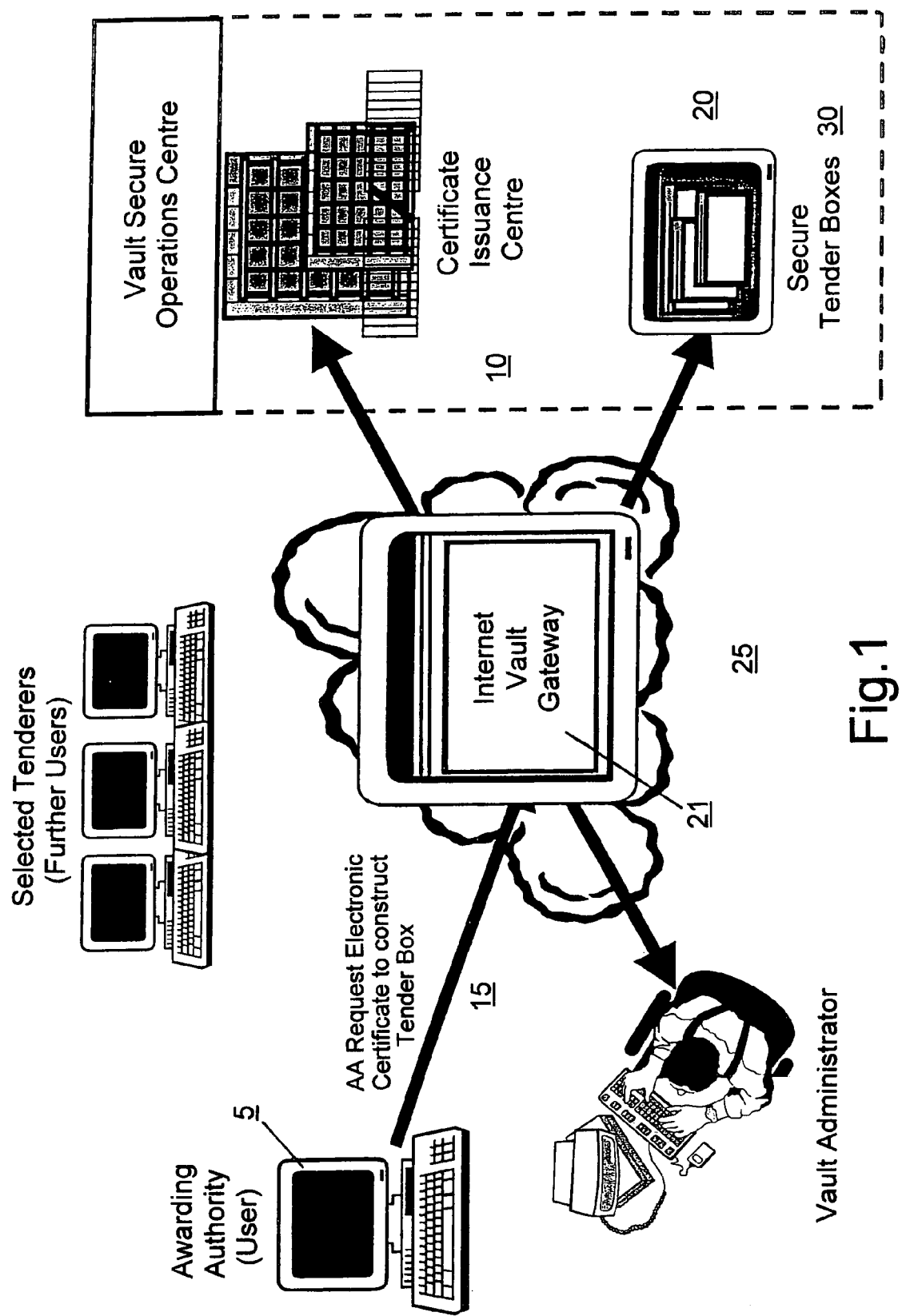
FIG. 1 a schematic representation of an electronic security/tender box system according to an embodiment of the present invention providing a Secure Electronic Deposit/Tender Box (SEDB) for an Account Holder (user or buyer) and AA's Application for a Tender Box is validated by the Electronic Signature Certificate issued.
Figure 2:
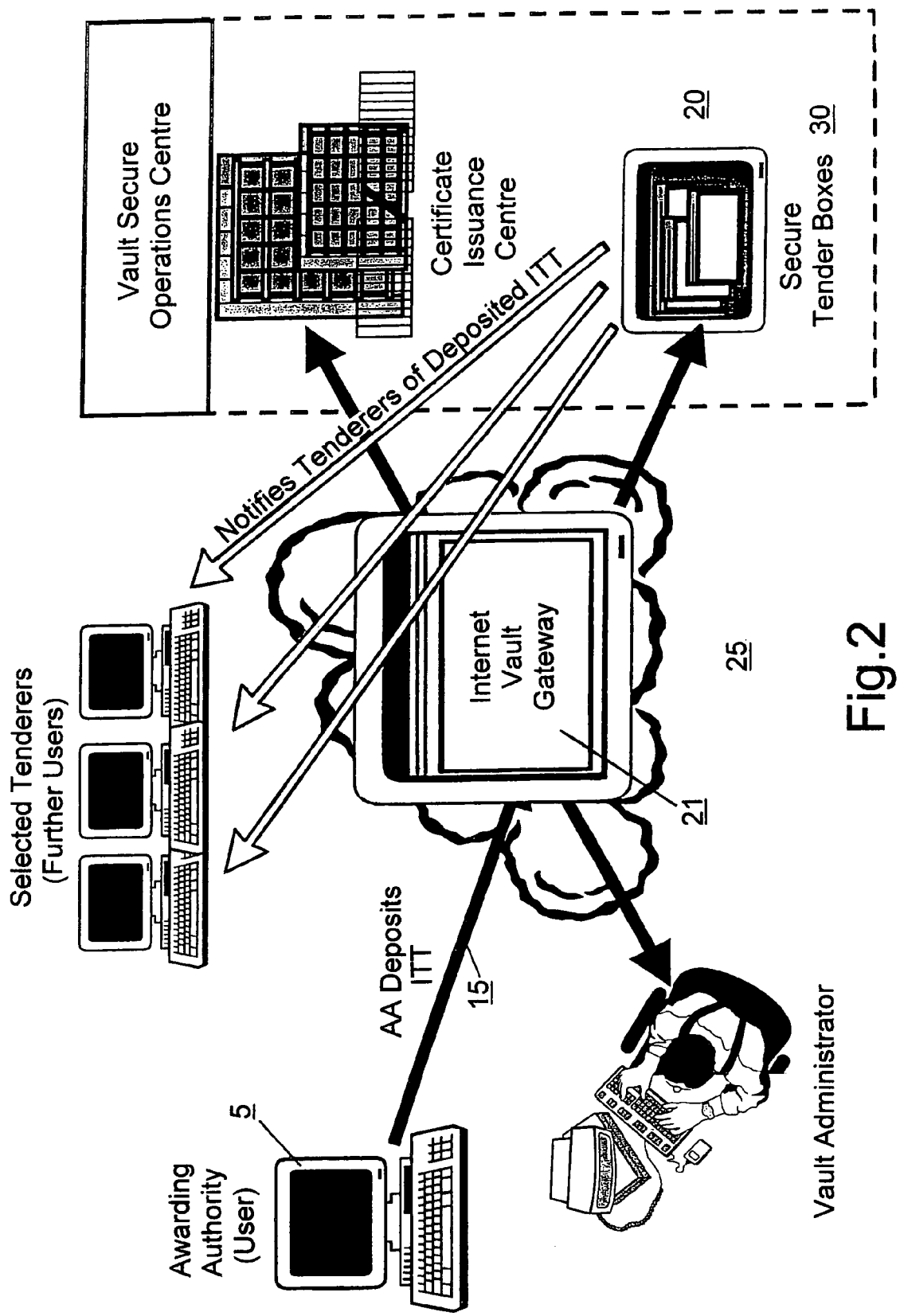
FIG. 2 a schematic representation of the electronic security/tender box system of FIG. 1 illustrating uploading of ITT (Invitation To Tender) documentation onto a newly created SEDB by an Account Holder and Tender Box sends SSL email to Tenderers once ITT deposited.
Figure 3:
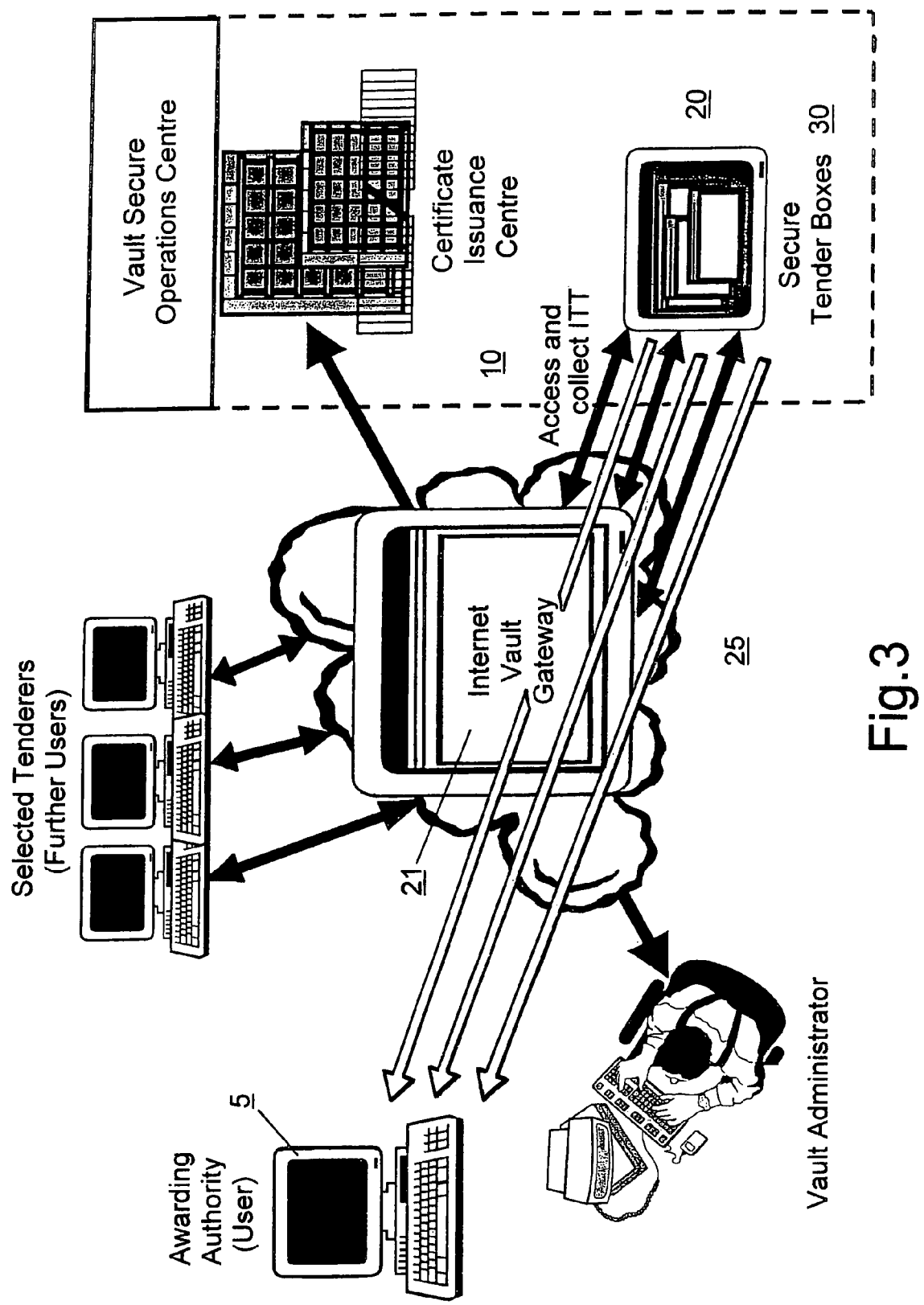
FIG. 3 a schematic representation of the electronic security/tender box system of FIG. 1 illustrating that after a predetermined date/time selected Invited Participants (further users or selected tenderers/suppliers) are able to access the ITT documentation stored on the SEDB and Tenderers purchase E-certificate, access and receive ITT using certificate and email confirmation sent to AA.
Figure 4:
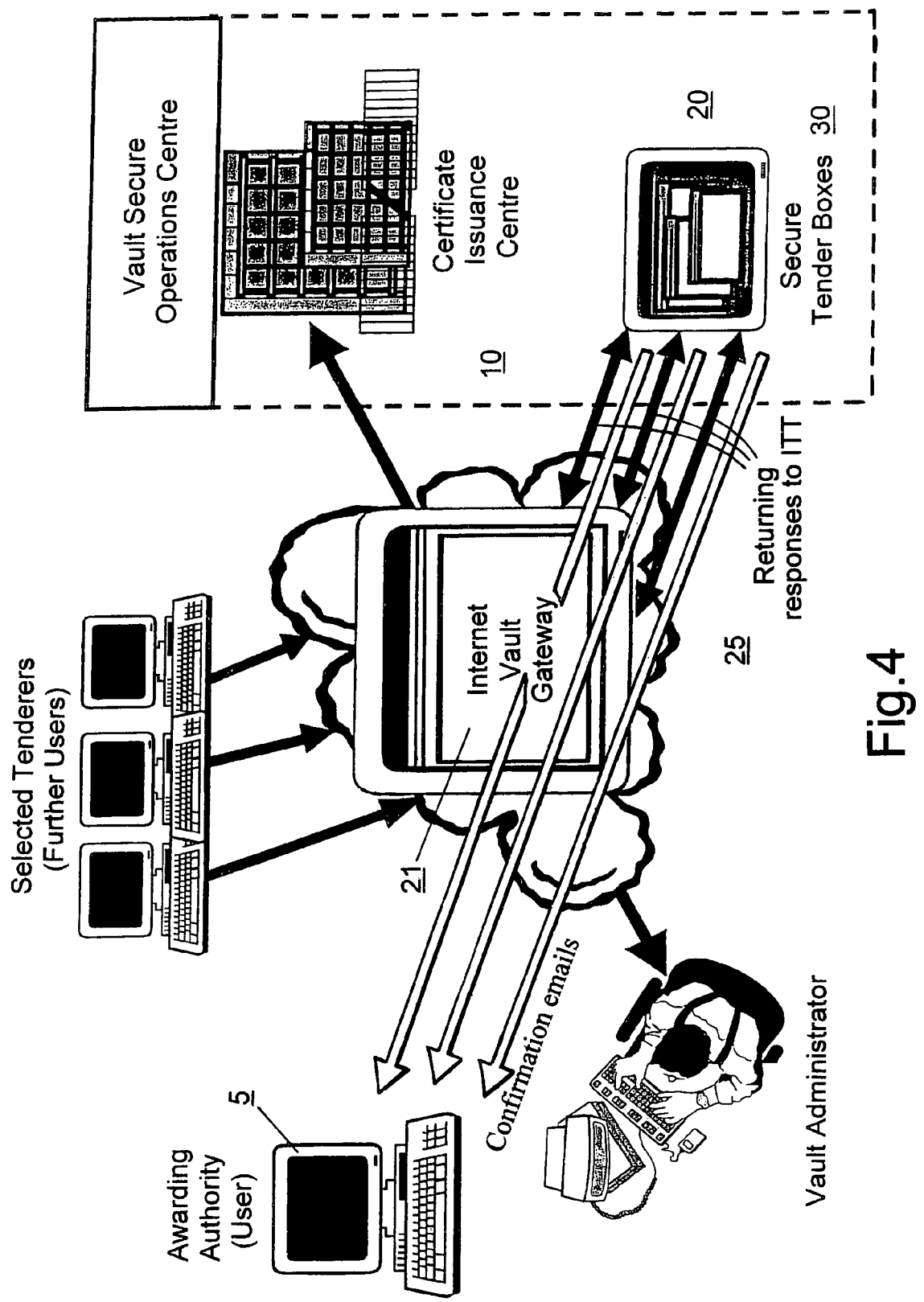
FIG. 4 a schematic representation of the electronic security/tender box system of FIG. 1 illustrating that selected tenderers upload their responses to the ITT onto the SEDB (also known as Tenders return completed ITT), and emails are sent notifying the Account Holder of this (also know as confirmation emails)
Figure 5:
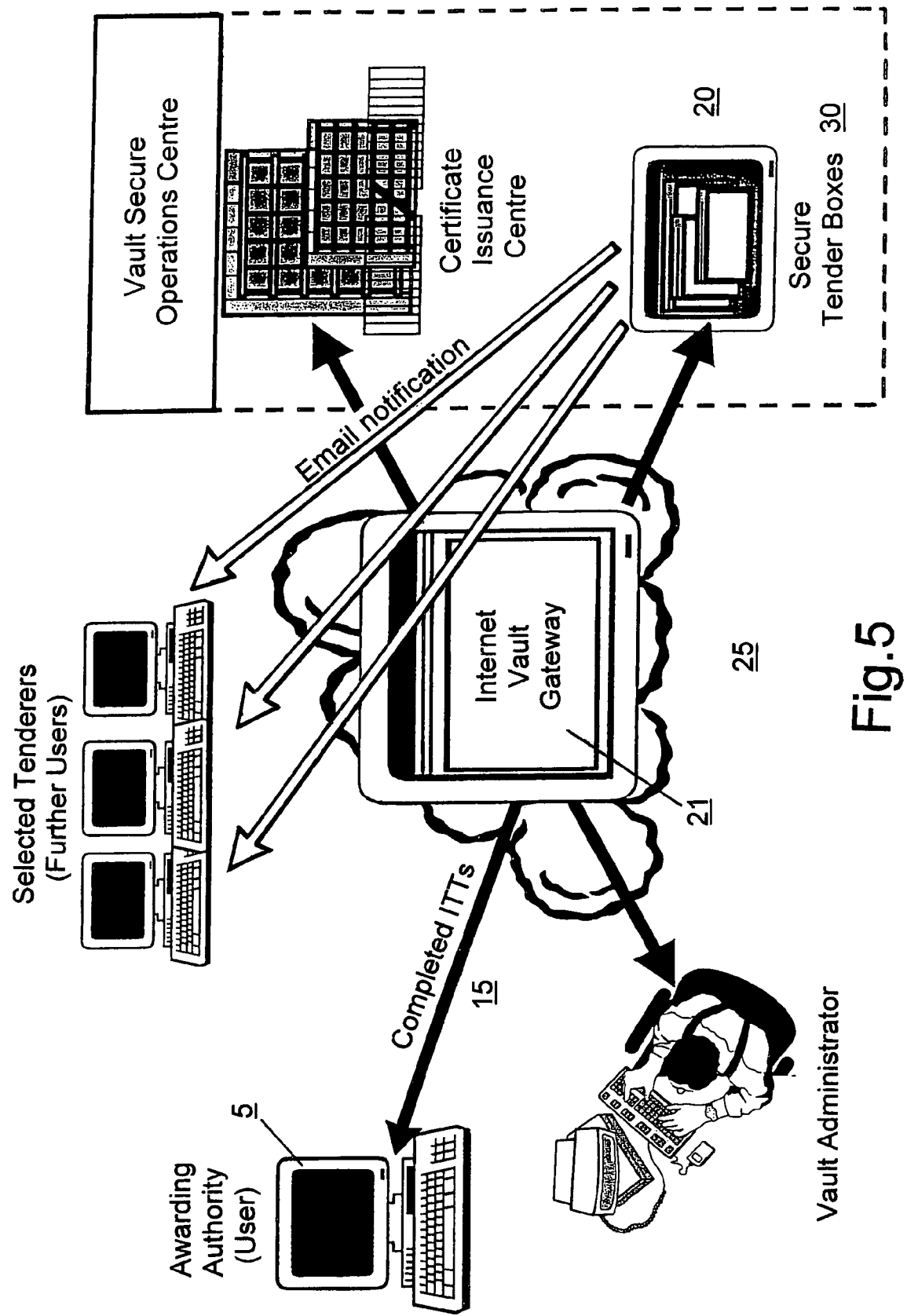
FIG. 5 a schematic representation of the electronic security/tender box system of FIG. 1 illustrating that after a predetermined date/time access to the documentation uploaded by the Invited Participants is granted to the Account Holder and the Account Holder is then able to download the documentation, the Invited Participants being notified by email of this, AA extracts ITT's after the appointed time, and email confirming sent to tenders.

Referring initially to FIGS. 1 to 5, there is illustrated a method of controlling access to electronic information comprising the steps of providing:

at least one user (Account Holder, buyer or contract Awarding Authority) apparatus 5;

a remote server 10;

a communications link 15 between the at least one user apparatus 5 and the remote server 10;

allocating disk storage space 20 on the remote server 10 unique to the at least one user apparatus 5;

allowing the at least one user access to the storage space 20 via username and password login to the server 10 and via secure encryption of data sent to/from the user apparatus 5 from/to the server 10. Communication between the user apparatus 5 and the server 10 is via an Internet gateway 21.

The user apparatus 5, remote server 10, communications link 15 and disk storage space 20 together provide a Secure Electronic Deposit/Tender Box System 25 including a Tender Box 30 consisting of a secure Web server with the following additional software components installed:

HTTPS enabled Web server software;

administration software for issuing digital certificates;

a CGI (Common Gateway Interface) application for providing the Web interface to the end users, and utilising interface libraries to an RDBMS (Relational Database Management System) and SMTP (Simple Mail Transfer Protocol);

an RDBMS server;

event-tracking application.

Figure 6A:
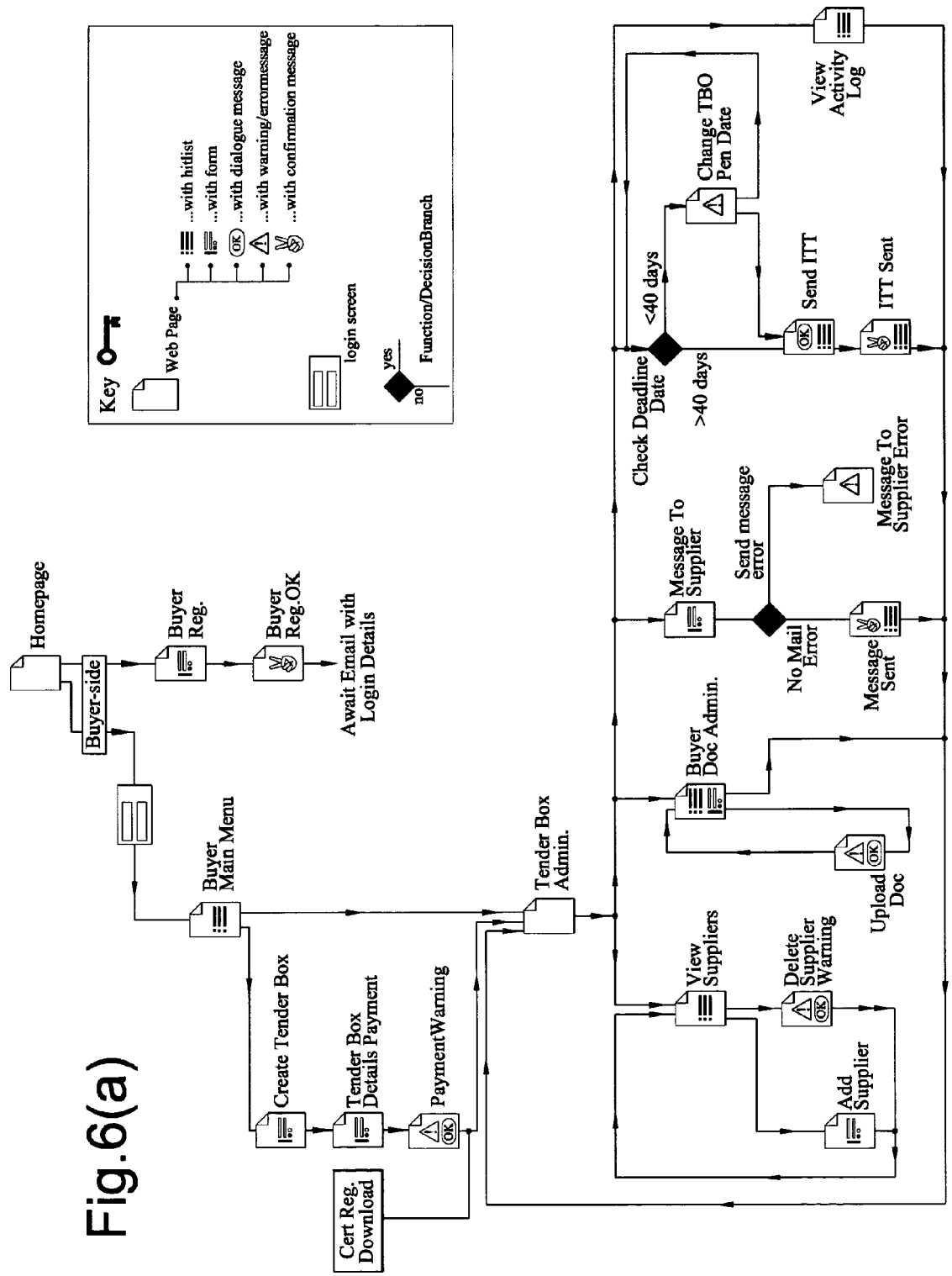
FIG. 6(a) a flow chart of a method of controlling access to electronic information by an Account Holder using the SEDB system of FIG. 1.

Referring now to FIG. 6(a), there is an illustration of a flow chart showing access to the electronic information within the Tender Box 30 by an Account Holder.

Figure 7:
FIG. 7 an Account Holder registration Web form for use in the methods of FIGS. 6(a) and (b)

If an Account Holder is new to the System 25, then the new Account Holder must first complete a necessary registration form as illustrated in FIG. 7. When the System 25 has accepted the new Account Holder an email is sent to the new Account Holder confirming the user name chosen by the Account Holder, and also advising of the password allocated to the Account Holder by the System 25.

The Account Holder may subsequently logon to the system 25 via a login screen using the user name and password. The user is then directed to the Account Holder main menu. If the Account Holder wishes to create a Tender Box 30, then appropriate selection from the Account Holder Main Menu is chosen by an Account Holder and the System 25 provides the Account Holder with the Create New Tender Box Web Form as shown in FIG. 8, and relevant payments may be made.

If this is the first Tender Box created by the Account Holder, then the Account Holder will be directed to an Account Holder Certificate Issuance Web Form, as shown in FIG. 9.

Figure 10:
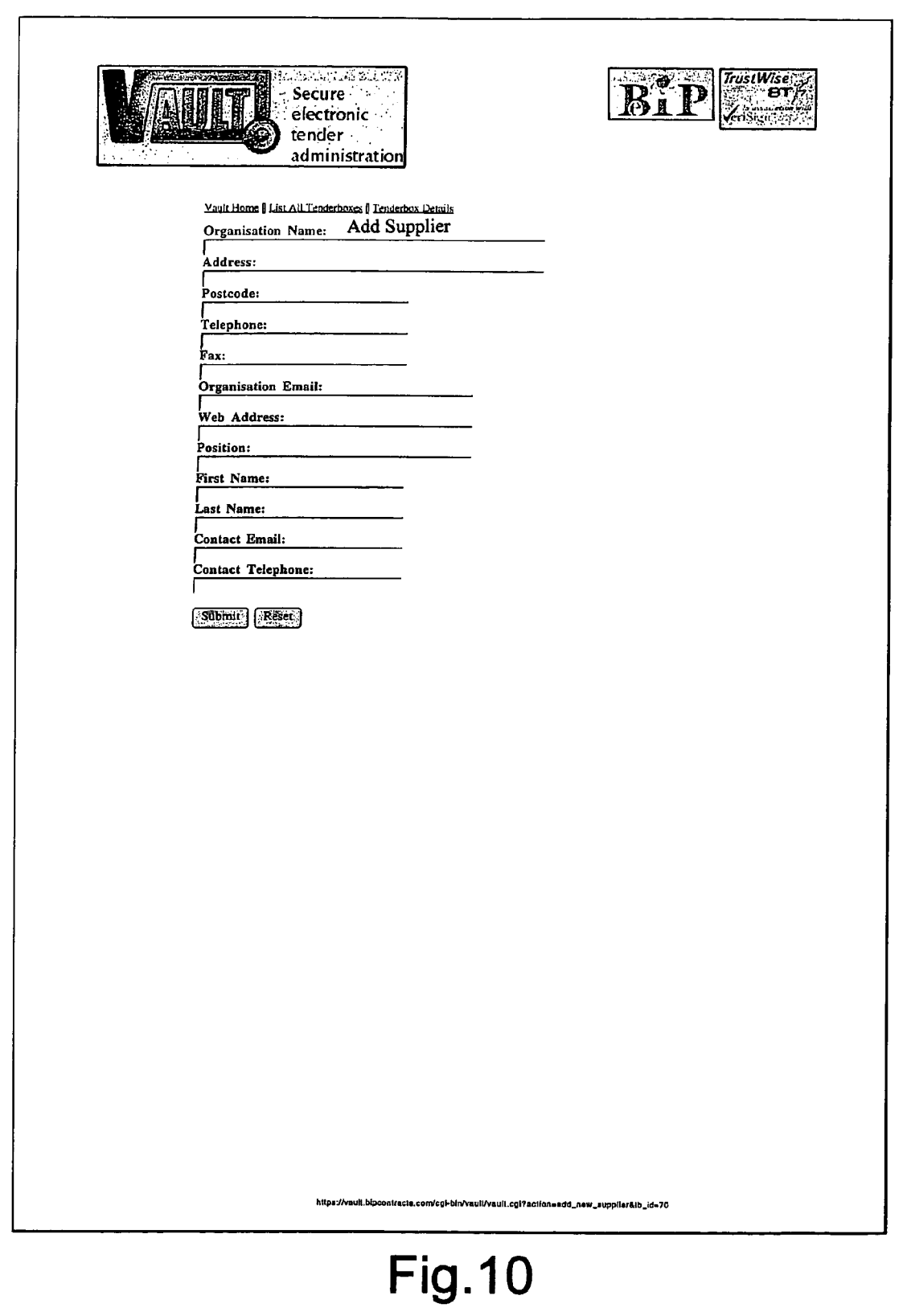

Subsequent access to the System 25 and a one or more Tender Boxes 30 of the Account Holder is illustrated in the flow chart. As can be seen from FIG. 10, if an Account Holder wishes to add an Invited Participant, (supplier), then the System 25 directs the Account Holder to an Add Invited Participant Web form.

At the specified Invited to Tender (ITT) date and time, access to the Tender Box 30 by the Account Holder is inhibited, and access to the Tender Box 30 by the Invited Participants is then allowed. As shown in the flow chart of FIG. 6(a), during the ITT time Invited Participants can upload the necessary documentation to the Tender Box 30 in order to tender for a particular contract.

At the tender opening date and time, access to the Tender Box 30 by the Invited Participants is again inhibited, and access to the Tender Box 30 by the Account Holder is allowed.

Figure 11:
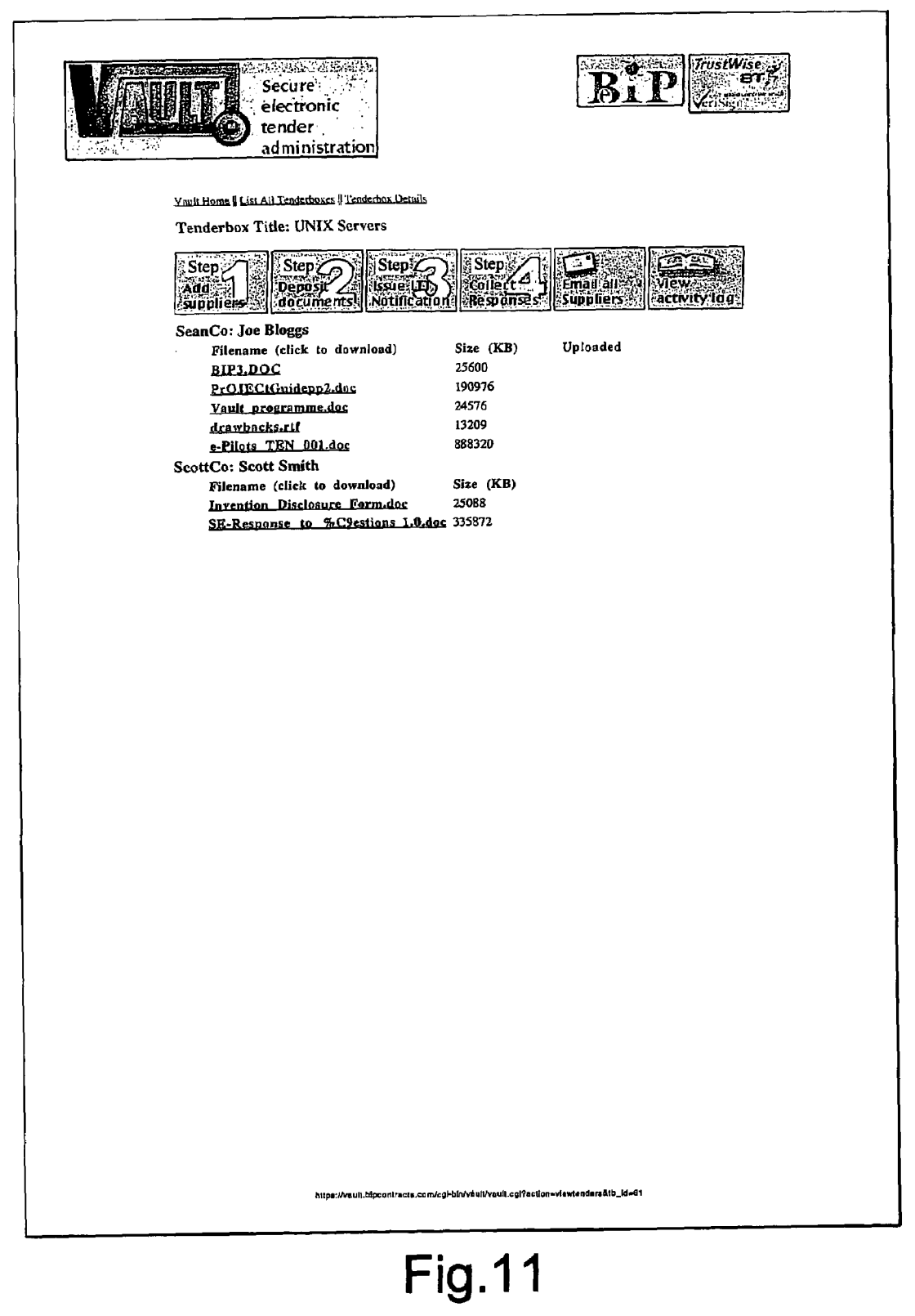
Figure 12:
FIG. 12 an SEDB Account Holder side menu detailing Invited Participants.

Referring to FIG. 11, the Account Holder may access a menu illustrating and detailing Invited Participants who had replied to the ITT, and further, the documents which have been provided by them. Further, as shown in FIG. 12, the Account Holder may view a Menu detailing the list of participants invited to the ITT by the Account Holder. Further, as shown in FIG. 13 the Account Holder can view a Menu (Activity Log) detailing all activity on the Tender Box 25. In FIGS. 11-13, the caption in Step 1 is add suppliers 2, the caption in Step 2 is deposit documents 3, the caption in Step 3 is Issue ITT notification 4, the caption in Step 4 is collect responses, the caption in Step 5 is email all suppliers, and the caption in Step 6 is view activity log.

Figure 6B:
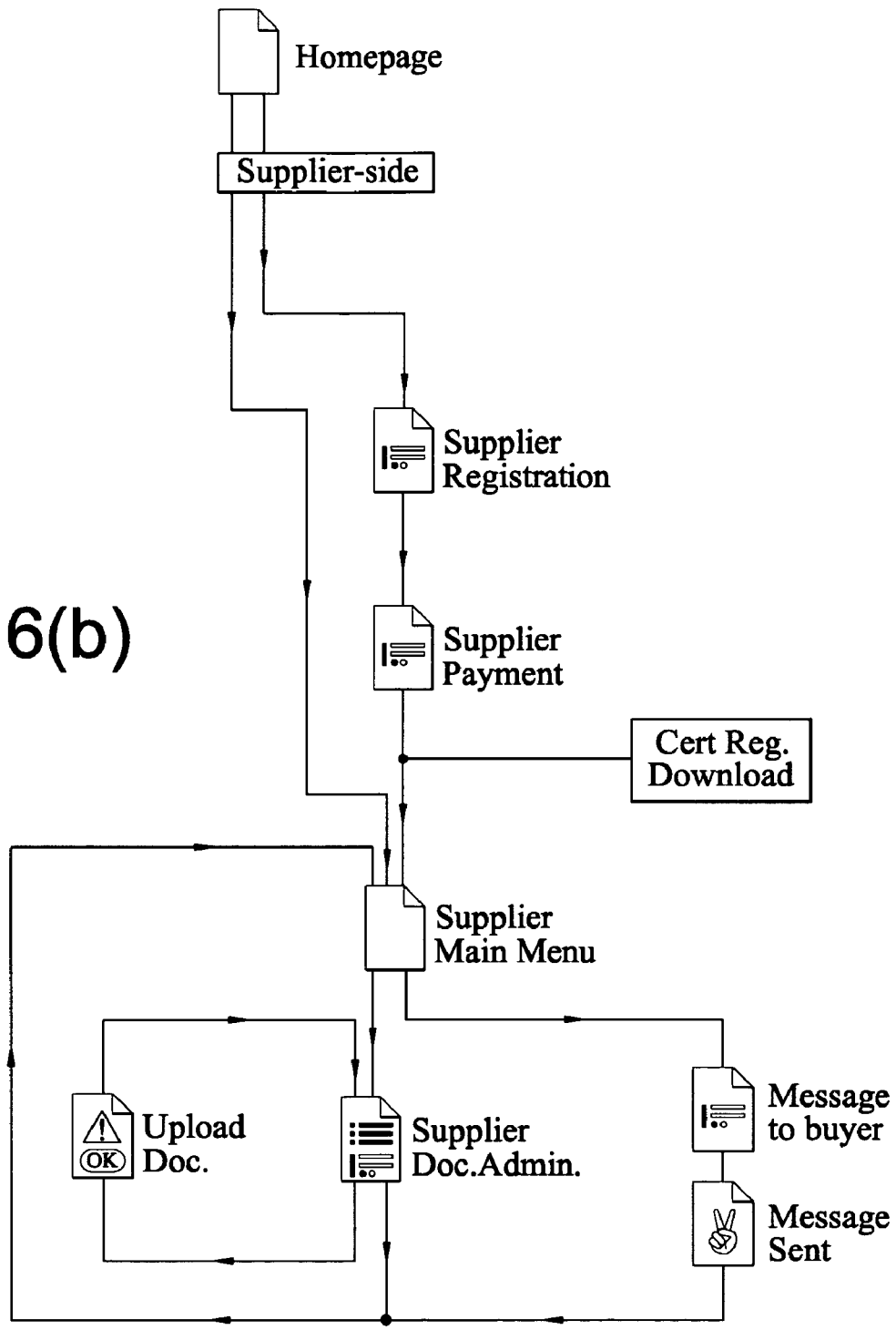
FIG. 6(b) a flow chart of a method of controlling access to electronic information by an Invited Participant using the SEDB system of FIG. 1.

If as illustrated in FIG. 6(b), the Invited Participant is new to the system 25, then the Invited Participant will be provided with an Invited Participant Registration Form, and may be required to make suitable payment. Subsequently, the Invited Participant is provided with a Digital Certificate Issuance Form, and the Digital Certificate is issued to the Invited Participant. This Digital Certificate may differ from the Digital Certificate issued to the Account Holder. Indeed, typically, a Digital Certificate issued to an invited participant will be specific to that particular Tender Box 25. A Digital Certificate issued to an Account Holder can be used by that Account Holder for all Tender Boxes 25 created by the Account Holder on the system 20.

Set up of the System 25 and operation thereof, will now be described in greater detail.

Accounts

The Secure Electronic Deposit Box Systems 25 is an account based Web application. A user becomes an Account Holder—possibly free of charge—by filling in and submitting Web forms (FIG. 7), which are generated by the CGI application at the heart of the system 25. Data submitted via these forms are processed by the CGI application, which stores the information in a record stored in a Secure Electronic Deposit Box System 25 database. At this point a basic authentication account is also created, so that the Web server software requires the user to type a username and password in order to access their account. The username is chosen by the user, the password is randomly generated by the CGI application, which sends the username/password to the user via email. All information passed between the Secure Electronic Deposit Box System 25 and Account Holders or Invited Participants is securely encrypted via SSL (Secure Socket Layer).

Electronic Deposit Box

Once a user has created an account the said user can create as many Secure Electronic Deposit Box entities as desired by clicking a link on the Web interface generated by the CGI application.

A 'Secure Electronic Deposit Box' 30 is a virtual entity consisting of a combination of data stored on a Database (Relational Database Management System), and storage space situated on the discs of the Secure Electronic Deposit Box System 25 server to actually store the documentation. The creation of this virtual entity, by creating records on the database and allocating storage space on disks of the server 10, controlled by the CGI application in response to the Account Holder input via the Web interface.

The database is used to store information about the user who holds the accounts, other users (Invited Participants) who are allowed access to the accounts by the main user, and scheduled event information relating to the SEDB. This information is entered by the Account Holder via Web forms (FIGS. 8 and 10), and processed by the CGI application.

There is a charge for each SEDB 30 created, which can be paid for instantly by online credit card transaction provided by a third party, or by requesting an invoice or bankers order. Online verification of the Credit card numbers is performed via a third party credit card verification system.

As part of the process of creating and paying for their first SEDB 30, the user applies for and installs a Digital Certificate onto their Web browser. Subsequent transfer of data between the user and the Secure Electronic Deposit Box System server 10 is then protected by this Digital Certificate, so that there is no possibility of unauthorised access to the documentation or database records held on the server.

A Digital Certificate provides a means of proving an identity in electronic transactions, much like a company badge or passport does in face-to-face interactions. Certificates also offer a means to control access to sensitive intranet and Internet information.

Individuals, devices, and organizations receiving certificates are normally called subscribers. VeriSign OnSite can generate and distribute end-user or certificates, which enable subscribers to encrypt (scramble) email 'N communications and interactions with Web sites to ensure privacy.

A certificate is a type of message that has been digitally signed by a Certification Authority (CA). Certificates contain the following information:

Name of the subscriber (actually, a unique name called the Distinguished Name);

Public key of the subscriber;

Operational period for the Certificate (the time between when the certificate becomes effective and when it expires);

Name of the Certification Authority that issued the Certificate;

Certificate serial number.

Since a Certificate is itself digitally signed, a person receiving a digitally signed message from a subscriber can trust that the content of the Certificate is from the CA, and that it was not altered. In essence, this means that the public key in the Certificate is guaranteed by the CA to be the public key of the subscriber named in the Certificate. The Certificate binds a public key to the identity of the subscriber named in the certificate. A Certificate gives the recipient of a message from the subscriber confidence that a public key is that of your subscriber. The recipient can therefore use the public key to verify the message's digital signature, and have confidence that it was in fact sent by your subscriber (and was not altered in transit). As well, someone can use the Certificate to have confidence that mail encrypted with the public key in a subscribes Certificate can only be designated by that subscriber.

Certificates are digitally signed messages that make use of public key cryptography techniques that employ two related keys (large, specially-derived numbers in a file): a public key, and a corresponding private key. Subscribers must keep their private keys secret. Public keys appear in the Certificates.

All Certificates that are part of the VeriSign public hierarchy are made publicly available over the Internet (https://digitalid.verisigmconilservices/client/. If one need someone's Certificate, one can find it and download it. If one has chosen to implement a private-label hierarchy, the Certificates one issues will only be viewable by people whom one chooses to provide access to.

After the CA has issued a Certificate, the applicant picks it up using a Web browser, email, or in person, and installs it in his or her computer. The user now has a private key (in a separate file to which only that user has access), and a public Certificate that includes his or her public key and the signature of the issuing CA.

An "end-user" Certificate as used herein, identifies a person. End-user Certificates can be used to access a Web site requiring that a certificate be presented, or for secure email using S/MIME. S/MIME enables subscribers to assure business associates and online service providers that they, the Certificate holders, truly are sending the electronic information (validation of identity), and that the information was not altered in transit (data integrity). End-user Certificates enable encryption (scrambling) to prevent unauthorized viewing of email contents. Further, Certificates enable non-repudiation—depriving the sender of a signed message the ability to claim that he or she did not send the message, or that he or she sent a different message.

The subscriber's public key is made available (in the Certificate) to anyone who wants to correspond with him or her. In a Certificate, the public key is bound to a subscriber's name, or to a site's fully qualified domain name (for example, www.company.com), and to other identifying information. This is analogous to the way one's name, department, and employee number are bound by one's photograph (and to the magnetic code that lets one into the building) on one's company ID card.

Certificate subscribers use public and private keys in the following ways:

A subscriber can digitally sign a message (email, document, software, object, and so on.) using his or her private key. The person receiving the subscriber's message can use the public key in the sender's Certificate to verify that it was, in fact, the subscriber who sent the message, and that the message was not altered in transit.

Subscribers can use Certificates to send encrypted messages. The person wishing to send the message obtains the public key of the recipient from his or her Certificate and encrypts the message using that public key. The resulting encrypted message can only be decrypted by the recipient using his or her private key, no other key will decrypt the message.

Figure 14:
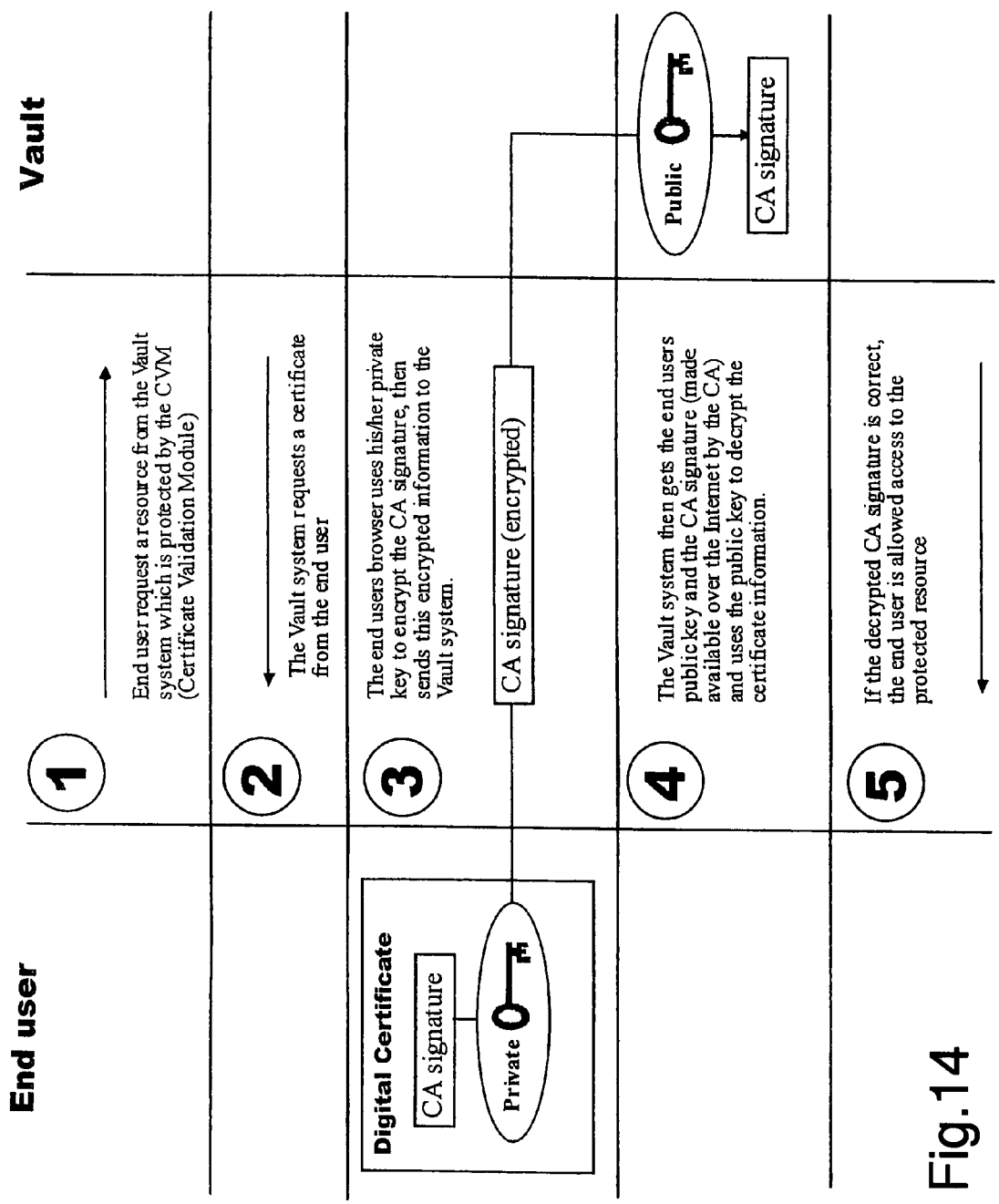
FIG. 14 a schematic diagram of the functioning of a Digital Certificate of an Account Holder or Invited Participant, ie "end user".

Referring to FIG. 14, a Digital Certificate prescribed by an Account Holder or Invited Participant ("end user") operates as follows.

The end user selects and presents a Certificate (this is typically done from a popup menu). The end user's browser uses his/her private key to encrypt the CA signature contained in the Certificate and then sends this encrypted information to the System 25. The System 25 then uses the end user's public key (available over Internet) to decrypt the Certificate information. The end user's public key can only decrypt data that was encrypted using the end user's unique private key. Therefore, if the decrypted data matches the CA signature (also publicly available over the Internet) the data must have come from the correct user. The end user is then allowed to access the protected resource (Tender Box 30).

Uploading Data

Uploading of data onto the system is done via a web interface, using the standard HTML<INPUT TYPE="file">input element. The Account Holder or Invited Participant navigates to the appropriate Web page, and clicks a "Browse" button on the Web form, causing a dialogue box to appear asking the user to select a file located on a local disk or local network server. This file is then securely encrypted using the private key on the Account Holder or Invited Participant's Digital certificate and uploaded to the Secure Electronic Deposit Box System server 10.

The CGI application is responsible for writing the uploaded file to the appropriate location on the server disk (this area of disk space can be thought of as the storage component of the Secure Electronic Deposit Box), and updating the database to reflect the change in status of the Secure Electronic Deposit Box 30.

Downloading Data

In order to download documents held in a Secure Electronic Deposit Box 30, the Account Holder or Invited Participant navigates to the appropriate Web page (generated by the CGI application) where they are presented with a list of the documents held in the Secure Electronic Deposit Box 30 to which they are currently allowed access. They then click on a hyperlink, which initiates a securely encrypted HITPS file download. Most Web browsers will ask the Account Holder or Invited Participant to choose a location on their computers' disks or local network where they wish to save the file.

Events

The Secure Electronic Deposit Box System 25 is not merely a passive application, requiring direct user interaction in order to provide it's functionality. The event tracking system allows Account Holders to set time limits on each of their SEDBs regarding when and how other users can access them, by entering the information into Web forms and submitting them. The CGI application is responsible for writing this information to the database.

Secure Electronic Deposit Box System Time Tracking System

The Secure Electronic Deposit Box System 25 has a unique event-tracking system, which is constructed in the following way in order to reduce over load on a system, which may consist of many thousands of user accounts. At predetermined intervals, e.g. 24 hours, when the server 10 is likely to be quietest, the CGI application searches all of the SEDB records stored on the database. This is done by activating the CGI application using a standard scheduling tool, for example, the daemon found on most UNIX systems. From this search, a table is dynamically generated within the database of all events, which are to take place the following day. This daily event table is consulted at predetermined regular intervals (say, 15 minutes) by the CGI application to determine whether the scheduled time for that event has elapsed. If so, the event is executed, and upon completion of successful execution, the entry is deleted from the daily event table.

If there is an error in the execution of the daily event table task, then that event remains on the table, and is attempted at the predetermined intervals. If the event has not successfully executed by the end of the day, it as carried over into the next days daily event table, and continually attempted until a predetermined time after the originally 20 scheduled time (say, 24 hours) after which an email message informing the user is sent.

Activity Log

A log is kept of all significant activity on the system 25. A 'Significant Activity' can be:
  a new user creating an account;
  a user logging onto the system;
  a user uploading a piece of documentation;
  a user downloading a piece of documentation;

Log data is stored on another table within the Secure Electronic Deposit Box System 25 database system by the CGI application. The CGI application provides a Web interface to the Secure Electronic Deposit Box System 25 which has links which allow the Secure Electronic Deposit Box System Account Holder to easily search and view activity relating to all their SEDBs, or one particular SEDB.

Access to each Secure Electronic Deposit Box may be for a predetermined period, for example one year. This can be extended on request. If the Account Holder does not wish to extend this period, they can send a request to the CGI application for an archive of the Secure Electronic Deposit Box. The CGI application then: exports the log activity pertaining to the SEDB to tab-separated text, compresses it together with all the data held within the SEDB, and send it to the Account Holder as an email attachment, or makes it available for http file download.

Payment

Account Holders pay a fee for each Secure Electronic Deposit Box 30 they create. In this embodiment, if required, Invited Participants pay for each Digital Certificate they install allowing them access to a specific SEDB created by the account holder. Payment is facilitated in the following ways:

Online credit card verification—payment for the creation of new Secure Electronic Deposit Boxes 30 is facilitated by the CGI application, which passes the user to a Web driven third-party credit card verification system.

Voucher System—a variation of the above scheme, the Account Holder can request and pay for, via the third-party credit card verification system described above, for a certain amount of credit. The CGI application would record the amount of credit purchased on the database, and debit from this amount every time the Account Holder created a new SEDB.

Invoice or bankers order—the CGI actions this method of payment by generating an email message which is directed to parties responsible for financial administration of the Secure electronic Deposit Box System.

A modified embodiment of the present invention provides a tendering/bidding/auctioning secure document deposit and exchange service, which may comprise one or more of the following steps:
  Account Holder/Invited Participant (Buyer/Seller) accesses VAULT website;
  System email address validated automatically;
  User creates user name and password generated;
  Requests a Digital certificate providing unique identification information;
  Credit card payment actioned online;
  Optional prepayment system;
  User registers others they wish to have access to deposited documentation/information;
  Lodges Documentation/information;
  Sets date and time for their access to others documents;
  Emails or otherwise notifies Invited Participants;

Email Invitation forwarded by SSL, contains unique safety deposit location;

Invited Participants access site address provided;

Participants create user name password;

Enter information corresponding to that logged by Buyer/Seller;

Provided matches Participant purchaser Digital certificated;

Participant gains access to store data and withdraws;

On completion of documentation Invited Participants, prior to the date and time set by the Buyer/Seller, return date using Password and user name for entry to the VAULT;

Their Digital Certificate is automatically checked and if OK they are allowed to deposit documentation;

At the time and date set by the buyer further access by Invited Participants is refused and the buyer may access the data and extract;

All transactions are registered and an audit log of all activity produced;

Every time a transaction is carried out an email confirmation is forwarded to both the buyer and the invited participant;

Reminder notices are transmitted to participants and Buyer/Seller at various stages of the process when no activity has been actioned;

A further embodiment of the present invention, provides an electronic safety deposit box which may be created and accessed by the following method:

Log on web site;

Create user name and password;

Request Security Box or Safety Deposit Box;

Pay using Credit Card;

Requests Digital certificate—providing information to verify user;

Opens Security Box and deposits data files;

Exits;

To re-enter;

Visits VAULT web address;

Inserts password and user name;

Certificate is automatically checked and access allowed;

Access to Safety Deposit Box is available, eg for up to one year;

Data may be stored for longer on request;

Insurance may be purchased on line;

Additional storage space may be requested and paid for online.

It will be understood that the electronic safety deposit box, according to the further modified embodiment, provides the user with a means for backing up various digital information, for example, digital photographic images.

It will be appreciated that the embodiments of the invention hereinbefore described are given by way of example only, and are not meant to limit the scope of the invention in any way.

It will be particularly appreciated that the invention provides the necessary levels of security for the storage of important electronic data at low cost and without any need for proprietary or bespoke software hardware. All that is required is a personal computer, an Internet connection and a standard web browser. Embodiment of the invention mirrors paper based procurement processes and allows buyers and suppliers to action business with full confidence in the security of the date the share/transmit or deposit.

The transfer of documentation in a secure manner over the Internet in situations involving several parties, and where there is a need for absolute confidentiality of data, and for deadlines to be observed, for instance during public sector procurement tender processes or during online auctioning/bidding is now possible.

Use of the Secure Electronic Tender Box, a virtual entity that is a combination of dynamically-stored data and Web server storage space and protection of the contents of said Electronic Deposit Box by Digital certificates and username/password login, ensures data confidentiality, data integrity, non-repudiation and proof of origin and receipt. The system also facilitates accounts, which allow users (referred to in this document as Account Holders) to create one or more Electronic Deposit Boxes.

The Secure Electronic Deposit Box System Account Holders are able to create tables of other users ('Invited Participants') who may have varying levels of access to the information contained in the Electronic Tender Box either all of the time, or at certain time predetermined by the Account Holder, this facilitated by the event-tracking system.

Advantages of one or more embodiments of the system include:

An ability of users (both Account Holders and Invited Participants) to store any kind of computer file on the system;

no specialised software or hardware required by any user—just a personal computer, a Version 4.x or above Web browser and an Internet connection;

the integration of online credit card verification and payment with that system, together with optional prepaid Voucher payment system;

time and date stamped activity log;

an ability of an Account Holder to archive and have sent to themselves all data relating to a time-expired Secure Electronic Deposit Box;

It will be further appreciated that various embodiments of the present invention may provide one or more of the following further advantages:

online Intranet/Internet software solution;

on line credit card payment and processing;

optional prepaid Voucher payment system;

online issuance of Digital certificate;

secure electronic safety deposit box with various levels of security;

data confidentiality;

data Integrity;

data Authentication;

non repudiation and proof of origin and receipt;

participants email address verification;

access restricted/authenticated by Password and Digital certificate;

messaging protected by Secure Socket layer transmission;

password protected entry control to VAULT;

Digital certificate entry control for access to individual Electronic Safety Deposit Boxes registered Account Holder of Safety Deposit Box and Invited Participants;

Participants selected are notified by SSL email, which contains details of a randomly generated website address for additional security;

no transaction can be executed without having the users Digital Certificate validated;

individual Digital certificate for each participant;

Digital Signatures can be used in place of Digital certificates;

real time audit log;

24 hour access;

optional time controlled access for document withdrawal;

action response messaging confirmations;

multiple or singular entry access;

Invitation and Validation of Invited Participants is controlled by Security Box key holder/renter;
Participants color coded in transaction log;
time and date stamped activity log;
time and Date access controlled;
stores securely all electronic data in all formats;
process mirrors paper based public and private sector tendering processes and provides for bidding (price competition) process and auctioning within a secure environment to validated and Invited Participants;
allows for multiple access and document networking;
allows for simple deposit and storage.
Requires no hardware software other than a standard Personnel Computer, Internet Access and web browser.

What is claimed is:

1. A method of controlling access to electronic information comprising the steps of:
providing at least one user apparatus;
a remote server; and
a communications link between the at least one user apparatus and the remote server;
allocating disk storage space on the remote server unique to the at least one user apparatus;
allowing at least one user access to the storage space via usemame and password login to the server and via secure encryption of data sent to or from the user apparatus from or to the server; and
allowing at least one further user access to the data storage space and wherein the further users access to the data storage space can be managed by the at least one user with regard to times and dates when the at least one further user can write to and/or read from the data storage space, wherein access to the data storage space by the at least one user is inhibited when the access to the data storage space by the further users is allowed.

2. A method of controlling access to electronic information as claimed in claim 1, wherein the secure encryption comprises:
transactions involving access to the storage space being protected by a requirement for a user to present a digital certificate.

3. A method of controlling access to electronic information as claimed in claim 2, wherein the digital certificate is required whenever the user attempts to write to or read from the storage space.

4. A method of controlling access to electronic information as claimed in claim 3, wherein data sent by a user apparatus is encrypted by public key in the case of SSL transactions and additionally by private key via presentation of a digital certificate in the case of accessing the data storage space.

5. A method of controlling access to electronic information as claimed in claim 4, wherein data received by the server is decrypted via private key in the case of SSL transactions and by public key in the case of digital certificate verification accessing the data storage space.

6. A method of controlling access to electronic information as claimed in claim 2, wherein the secure encryption further comprises transactions between user and server being encrypted using Secure Socket Layer (SSL).

7. A method of controlling access to electronic information as claimed in claim 1, wherein each said at least one further user is allowed access to the data storage space upon presentation of a further digital certificate.

8. A method of controlling access to electronic information as claimed claim 1, wherein the communications link comprises the Internet.

9. A method of controlling access to electronic information as claimed in claim 1, wherein managing of the at least one further users access to the data storage space by the at least one user involves the at least one user setting at least one date and at least one time period for access by the at least one further users.

10. A method of providing an account-based Internet/Intranet service which allows an at least one account holder to:
create at least one secure electronic deposit box on a centralised server in which box or boxes store documentation in a secure environment;
manage timeframes for invited participants to access said documentation and/or for the invited participants to upload to the centralised server further documentation, wherein
the method utilizes a method of controlling access to electronic information as claimed in claim 1.

11. A method as claimed in claim 10, wherein the method further allows the at least one account holder to track activity relating to each said at least one electronic deposit box.

12. A programmed computer or server adapted to implement the method of claim 11.

13. A programmed computer or server adapted to implement the method of claim 10.

14. A programmed computer or server adapted to implement the method of claim 1.

15. An electronic safety deposit system or tender box system comprising:
at least one user apparatus;
a remote server;
a communications link between the at least one user apparatus and the remote server;
disk storage space allocated on the remote server unique to the at least one user apparatus;
means for allowing at least one user access to the storage space via username and password login and via secure encryption of data sent to or from the user apparatus from or to the server;
means for allowing at least one further user access to the data storage space; and
means for managing the further users access to the data storage space by the at least one user with regard to times and dates when the at least one further user can write to and/or read from the data storage space, and further
means for inhibiting access to the data storage space by the at least one user when the access to the data storage space by the further users is allowed.

16. An electronic safety deposit system or tender box system as claimed in claim 15, wherein the secure encryption comprises transactions involving access to the storage space being further protected by a requirement for a user to present a digital certificate, in use.

17. A secure electronic deposit or tender box system comprising an account-based Internet or Intranet server system with a worldwide web (HTTP) interface for uploading and downloading documentation onto a centralised server in a secure environment, using digital certificates to ensure data confidentiality, data integrity, data authentication, non-repudiation and proof of origin and receipt, the system using an electronic safety deposit system as claimed in claim 15.

* * * * *